United States Patent [19]

Oyama

[11] Patent Number: 5,291,684
[45] Date of Patent: Mar. 8, 1994

[54] CASTING HANDLE FOR A FISHING ROD

[75] Inventor: Mitsuyoshi Oyama, Tokyo, Japan

[73] Assignee: Daiwa Seiko, Inc., Tokyo, Japan

[21] Appl. No.: 54,204

[22] Filed: Apr. 30, 1993

[30] Foreign Application Priority Data

Jun. 16, 1992 [JP] Japan .................................. 4-47952

[51] Int. Cl.$^5$ .............................................. A01K 87/00
[52] U.S. Cl. .............................................. 43/23; 43/22
[58] Field of Search ....................................... 43/22, 23

[56] References Cited

U.S. PATENT DOCUMENTS

| D. 108,721 | 3/1938 | Morgan | 43/23 |
| 1,916,924 | 7/1933 | Foss | 43/22 |
| 2,454,529 | 11/1948 | Thompson | 43/23 |
| 2,667,713 | 2/1954 | Stephens | 43/23 |
| 4,848,022 | 7/1989 | Ozeki | 43/22 |
| 4,920,682 | 5/1990 | Ardreasen | 43/22 |
| 5,088,225 | 2/1992 | Yamamoto | 43/22 |
| 5,115,591 | 5/1992 | Oyama | 43/22 |

FOREIGN PATENT DOCUMENTS 2-174624 7/1990 Japan .

Primary Examiner—Kurt C. Rowan
Attorney, Agent, or Firm—Longacre & White

[57] ABSTRACT

A casting handle for a fishing rod includes a reel mount which has a reel leg placing section in the upper surface which is to place a reel leg in position to hold the reel, a lower surface curved in such a manner that it is lowered most at the middle in the direction of width and raised towards both side edges, and a sideward expanded portion which is formed by expanding horizontally the portion of the reel leg placing section which is substantially the rear half of the reel leg placing section. The rear end portions of the edge lines of the sideward expanded portion ar raised obliquely backwardly on one side of the reel mount which is opposite to the other side where a trigger is protruded. With the casting handle, the angler can hold the casting handle stable in the casting operation, and the fingers gripping the casting handle feel fitted on and comfortable with it during the palming operation.

11 Claims, 3 Drawing Sheets

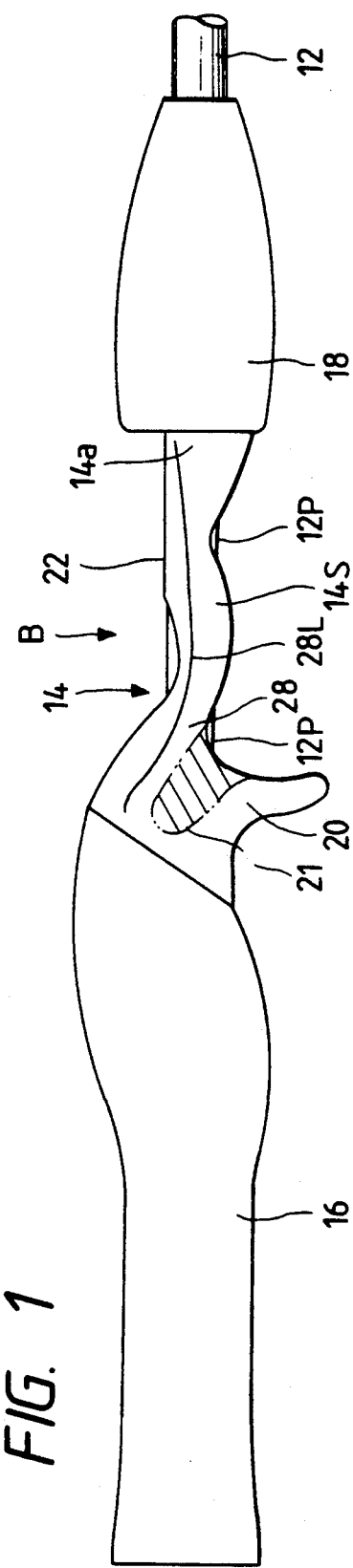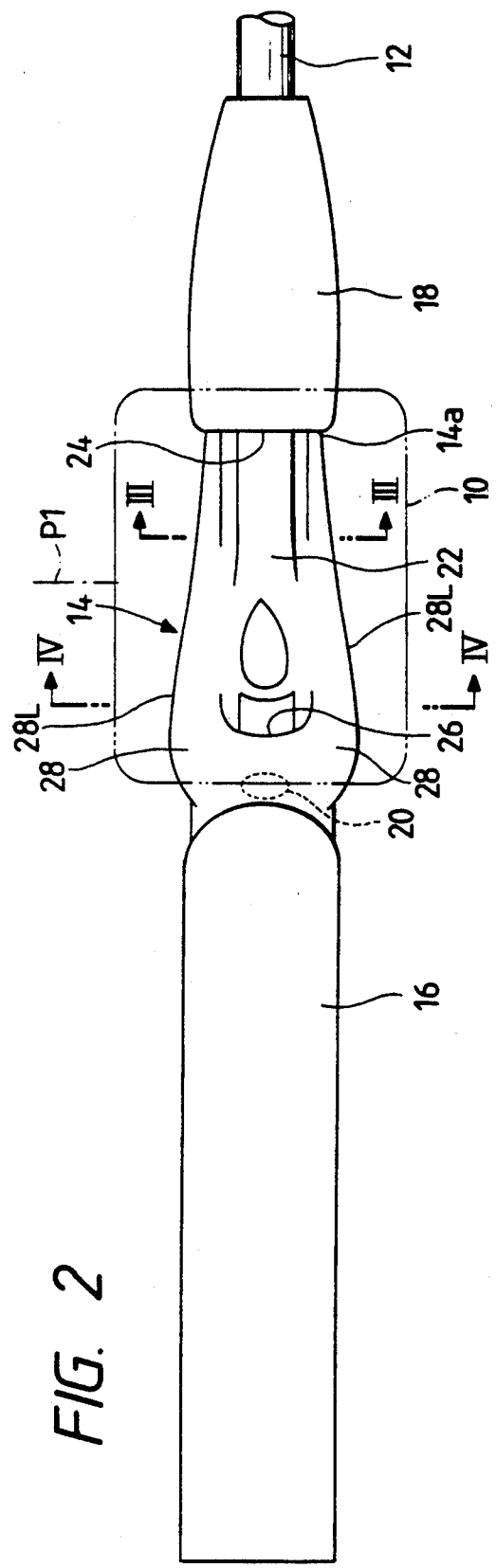
FIG. 1
FIG. 2

CASTING HANDLE FOR A FISHING ROD

BACKGROUND OF THE INVENTION

1. Field of the Invention

This invention relates to fishing rods, and more particularly to a casting handle for a fishing rod.

2. Description of the Prior Art

Typically, an angler performs both a casting operation and a palming operation with a fishing rod equipped with a casting handle. In the casting operation, the angler throws the bait to a desired point from behind while holding the grip of the fishing rod with one hand. The palming operation follows the casting operation. In the palming operation, the angler holds the fishing rod substantially horizontal while gripping the reel mount mainly.

In the casting motion, the angler may cast the line in a twisting or whipping motion so that the bait is accurately thrown to the aimed point. In this case, forced are applied to the hand of the angler, particularly to the fingers, in many directions. In the palming motion, sometimes the angler must hold the fishing rod horizontal for a long time while concentrating attention to the rod itself. Thus, the palming operation is rather difficult to continue without substantial discomfort.

In order to eliminate the difficulty accompanying the palming operation, Japanese Patent Application (OPI) No. 174624/1990 (the term "OPI" as used herein means an "unexamined published application") has proposed a reel mount which has a lower surface curved in cross section, whose plan view is an elongated ellipse having a wide portion.

In the proposition disclosed by the prior art, the fingertips to which forces are applied most during the palming operation are not taken into account, and instead main attention is paid to the improvement in the feeling of fitness of the fingers. Furthermore, the proposition does not take casting operation into consideration. Therefore, the proposition still involves problems to be solved in the improvement of the stability of the grip in the casting operation and the comfortableness of the fingertips during the palming operation.

SUMMARY OF THE INVENTION

Accordingly, an object of this invention is to provide a casting handle with a reel mount which the angler can grip stably in the casting operation, and the gripping fingers feel comfortably fitted on with the fingertips being in a comfortable position during the palming operation.

The foregoing object and other objects of the invention have been achieved by the provision of a casting handle for a fishing rod which has a reel mount which, according to the invention, includes a reel leg placing section in the upper surface thereof, a lower surface curved in such manner that the surface is lowered most at the middle in the direction of width, and raised towards both side edges, and a sideward expanded portion which is formed by expanding horizontally the rear half of the reel leg placing section, wherein the rear end portions of the edge lines of the sideward expanded portion are raised obliquely backwardly on one side of the reel mount which is opposite to the other side where a trigger is protruded.

The curved lower surface, and the sideward expanded portion allow the fingers to feel fitted on the casting handle during the palming operation. As was described above, the rear end portions of the edges of the sideward expanded portion are raised obliquely backwardly on the one side of the reel mount which is opposite to the side where the trigger is protruded. That is, the sideward expanded portion is extended along the periphery of the reel, and therefore no large gap is formed between the reel and the reel mount. Hence, the fingertips, which touch the periphery of the reel, are prevented from being caught between the reel and the reel mount or from having an ache. In addition, the rear end portion of the sideward expanded portion is raised obliquely backwardly, thus forming a space with the trigger in which the finger can be placed. Thus, the tip of the index finger which grips most strongly in the casting operation is sufficiently held in the space.

The nature, principle, and utility of the invention will be more clearly understood from the following detailed description of the invention when read in conjunction with the accompanying drawings.

BRIEF DESCRIPTION OF THE DRAWINGS

In the accompanying drawings:

FIG. 1 is a side view showing a casting handle according to this invention;

FIG. 2 is a plan view taken in the direction of the arrow B in FIG. 1;

DETAILED DESCRIPTION OF THE INVENTION

Figure 3:
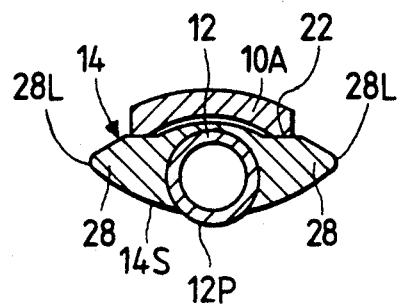
FIG. 3 is a cross sectional view taken along line III—III in FIG. 2.

A preferred embodiment of this invention will be described with reference to the accompanying drawings.

FIGS. 1 through 4 show a reel mount 14 according to the invention.

As shown in those figures, a rod pipe 12 penetrates a front grip 18, the reel mount 14, and a rear grip 16 in the stated order. The front grip 18, the reel mount 14, the rear grip 16, and the rear end portion of the rod pipe 12 form a casting handle. The reel mount 14, the rear grip 16, and the rear end portion of the rod pipe 12 form one unit. On the other hand, the front grip 18 has a threaded portion (not shown) inside it. The threaded portion is engaged with a threaded portion (not shown) which is a part of the front end portion of the reel mount 14, so that the front grip 18 is threadingly secured to the reel mount 14 while the reel leg 10A of a reel 10 set on the reel mount 14 is fixedly held in position on the reel mount 14 (see FIGS. 4 and 6).

A reel leg placing section 22 is formed in the upper surface of the reel mount 14, to receive the reel leg 10A of the reel 10. The reel leg placing section 22 has a rear reel leg receiving portion 26 to receive the reel leg 10A at the rear end, and a front reel leg receiving portion 24 at the front end in the form of a gap between the reel leg placing section 22 and the front grip 18. With the reel leg 10A engaged with the reel leg receiving portions 24 and 26, the front grip 18 is turned on the above-mentioned threaded portions until the reel 10 is fixedly held in position on the reel mount 14 as shown in FIGS. 2, 4, 5 and 6.

Figure 5:
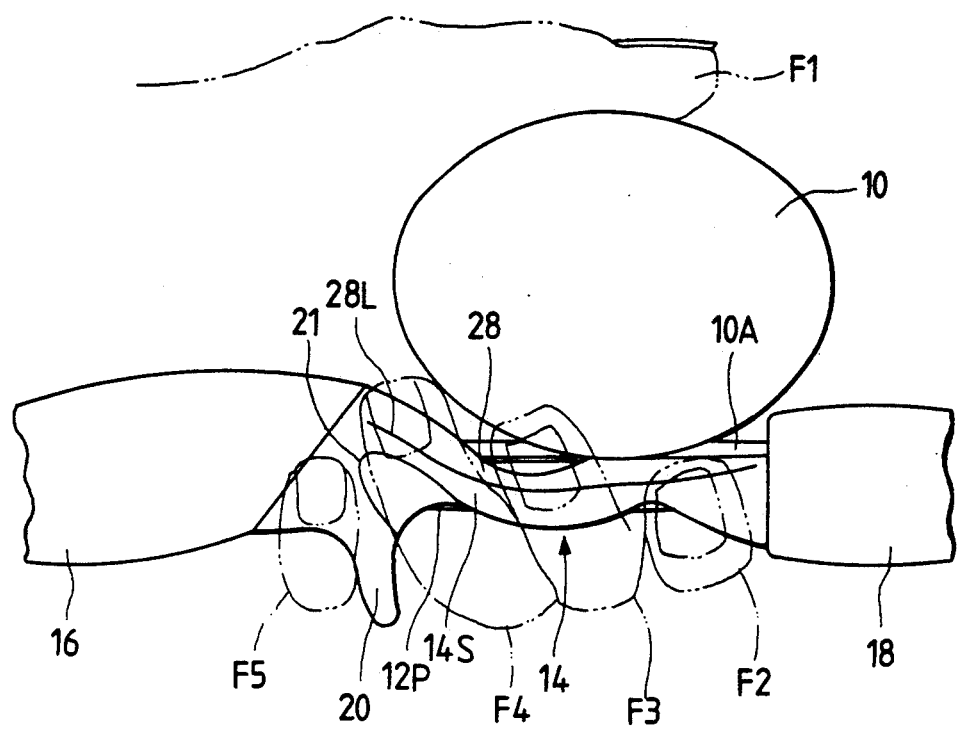
FIG. 5 is an explanatory diagram showing how the casting handle of the invention is gripped during a palming operation; and, FIG. 6 is an explanatory diagram showing how the casting handle of the invention is gripped in a casting operation.

The reel mount 14, as shown in FIG. 2, is formed to gradually increase in width from the front end 14a substantially to the position of a trigger 20 (FIG. 1) formed on the lower surface of its rear end portion, thus forming a sideward expanded portion 28, and then decreased in width so as to merge with the rear grip 16. Thus, the sideward expanded portion 28 is located at the rear of the central point P1 (FIG. 2) of the reel 10 in the lengthwise direction whereby point P1 is substantially at the middle of the reel leg placing region 22 in the lengthwise direction. That is, of the reel mount, the portion which is held by the middle finger and the ring finger most strongly during the palming operation is made wider as shown in FIG. 5.

Figure 4:
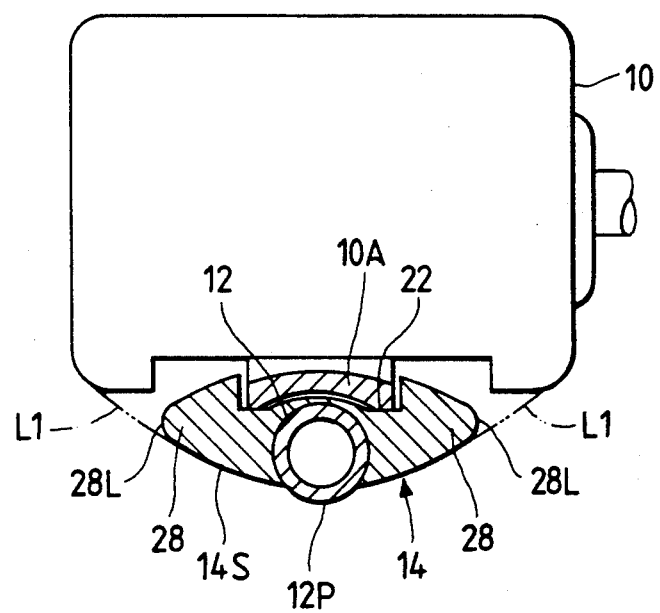
FIG. 4 is a cross sectional view taken along line IV—IV in FIG. 2.

The lower surface 14S of the reel mount 14 is shaped as shown in FIGS. 1, 3 and 4. That is, the lower surface is curved in such a manner that it is lowered most at the middle of the reel mount 14 in the direction of width and raised towards both side edges. This configuration is suitable for the angler to comfortably hold the reel mount 14 and the reel 10 with his fingers, because it allows the angler to bend the fingers smoothly. Therefore, it is desirable that the elongation of the curved lower surface 14S of the reel mount 14 is extended near the outer peripheral portion of the reel 10 as indicated by the phantom line L1 in FIG. 4. In addition, the width of the reel mount 14 should be substantially as indicated in FIG. 4 with respect to the width of the reel. When the width of the reel mount 14 is designed as described above, the fingertips will never be caught between the reel mount 14 and the reel 10, and both the reel mount 14 and the reel 10 can be held at the same time, which will prevent the angler from getting tired during the palming operation.

As shown in FIG. 3 or 4, the rod pipe 12 appears partially in the lower surface 14S of the reel mount 14 as indicated at 12P. The protrusion of the rod pipe 12 through the lower surface 14S allows the vibration of the fish to transmit directly to the fingers holding the casting handle. For this purpose, as shown in FIG. 1 the lower surface 14S is curved downwardly at the middle in the lengthwise direction, and curved upwardly on both sides of the middle.

The reel mount 14 is so shaped that its lower surface 14S is slackened at the middle in the lengthwise direction, and its upper surface is prevented from interfering with the peripheral portion of the reel 10 fixedly mounted on the reel leg placing section; that is, the edge lines 28L of the sideward expanded portion 28 are extended slightly downwardly from the middle, in the lengthwise direction, of the reel mount 14 towards the rear. However, the edge lines 28L may be extended horizontal depending on the configuration of the reel. The upper surface of the reel mount 14 may be carved downwardly or chamfered on both lateral sides thereof as shown in FIGS. 3 and 4 so as not to interfere with the peripheral portion of the reel 10 even if the reel 10 has a relatively small width.

The rear end portion of the edge lines 28L are raised obliquely backwardly at the portion of the reel mount which is opposite to the position where the trigger 20 is protruded. More specifically, the rear end portions of the edge lines 28 are extended with the peripheral configuration of the reel 10 mounted on the reel mount taken into consideration; that is, they are extended along the periphery of the reel with a little space therebetween so that they may not interfere with the reel. A smooth dent or recess 21 is formed in an area between the trigger 20 and the edge line 28L, which dent is extended along the configuration of the edge line 28L.

Figure 6:
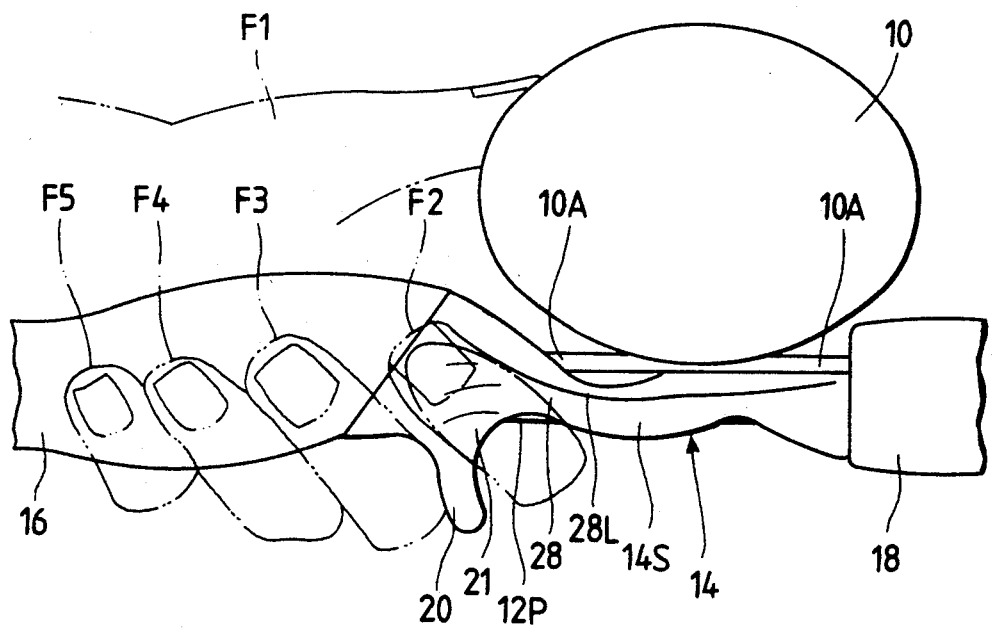

The casting handle including the above described reel mount is held as shown in FIGS. 5 and 6 during the palming operation and casting operation, respectively.

In the case of the palming operation, the reel mount 14 and the reel 10 are held by the hand as shown in FIG. 5. During a typical palming operation, the thumb F1 is set on the upper surface of the reel 10, with the little finger F5 positioned behind the trigger 20, and the index finger F2, the middle finger F3, and the ring finger F4 set in front of the trigger 20. When the reel mount together with the reel is held in this way, since the lower surface 14S of the reel mount 14 is shaped as was described above, the fingers comfortably fit on the casting handle. In addition, since the rear end portion of the sideward expanded portion 28 is extended along the periphery of the reel 10, no large gap is forced between the reel 10 and the reel mount 14. Therefore, the fingertips, which grip strongly during the palming operation, are prevented from being caught between the reel and the reel mount or from having an ache. Hence, the angler can continue the palming operation for a long time. Furthermore, the smooth dent 21 (FIG. 1) is curved in the direction in which the ring finger F4 and the middle finger F3 are naturally laid during the palming operation. Therefore, the angler scarcely gets tired even if he holds the casting handle strongly for a long time.

In the case of the casting operation, the reel mount 14 and the reel 10 are held by the hand as shown in FIG. 6. In the ordinary casting operation, as shown in FIG. 6 the middle finger F3, the ring finger F4 and the little finger F5 are set behind the trigger 20 while the index finger F2 is set in front of the trigger 20. In the casting operation, the tip of the index finger F2, which grips most strongly, is laid obliquely backwardly as shown in FIG. 6; however, the index finger F2 can sufficiently withstand forces applied thereto in many directions, because the fingertip is sufficiently held in the smooth dent 21 which is located between the trigger 20 and the edge lines 28L of the sideward expanded portion 28 and curved along the edge lines 28L. Thus, the bait can be cast at the aimed point accurately.

As is apparent from the above description, with the casting handle according to the invention: in the casting operation, the angler can hold the casting handle stably; and during the palming operation, the fingers gripping the casting handle feel fitted on and comfortable with it.

While the invention has been described in connection with the preferred embodiment, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A casting handle for a fishing rod, comprising a reel mount having:
 a reel leg placing section in an upper surface of said reel mount, said reel leg placing section extending in a longitudinal direction from a front end to a rear end and defining side edges;

a lower surface opposite said upper surface being curved such that, when viewed in cross section, said lower surface is most distanced from said upper surface at a middle portion and raised toward said side edges;

a sideward expanded portion which is formed by expanding said side edges of said reel leg placing section in a transverse direction with respect to said longitudinal direction at a portion proximate said rear end of said reel leg placing section; and a trigger protruding from said lower surface at a position substantially opposite said rear end of said reel leg placing section, wherein edge lines are defined by said side edges, and a rear end portion of said edge lines of said sideward expanded portion is obliquely raised in a direction opposite said trigger.

2. The casting handle according to claim 1, further comprising a smooth recess formed between said trigger and said edge lines.

3. The casting handle according to claim 2, wherein said smooth recess is extended in substantially the same direction as said rear end portions of said edge lines.

4. The casting handle according to claim 1, wherein, when viewed in the longitudinal direction, said lower surface is most distanced from said upper surface at a middle section between said front and rear end.

5. The casting handle according to claim 4, wherein said lower surface is curved toward said upper surface in said longitudinal direction on each side of said middle section.

6. The casting handle according to claim 1, further comprising at least one aperture located in said lower surface of said reel mount, said aperture adapted to receive a portion of said fishing rod whereby a vibration of a fish is transmitted to an angler's finger positioned on said casting handle.

7. The casting handle according to claim further comprising a rear reel leg receiving portion at said rear end of said reel leg placing section for receiving a reel leg of a fishing reel.

8. The casting handle according to claim 7, wherein said rear reel leg receiving portion is located adjacent said sideward expanded portion in said longitudinal direction.

9. The casting handle according to claim further comprising a front reel leg receiving portion at said front end of said reel leg placing section for receiving a reel leg of a fishing reel.

10. The casting handle according to claim 10, wherein said front reel leg receiving portion is defined by a gap between said reel leg placing section and a front grip threading engaging said reel mount.

11. The casting handle according to claim 1, further comprising means for preventing said upper surface from interfering with a peripheral portion of a reel fixedly mounted on said reel leg placing section.

* * * * *